July 2, 1963
P. HADZERIGA
3,096,153
ION EXCHANGE PROCESS FOR PRODUCING POTASSIUM
SULFATE AND SULFURIC ACID
Filed Oct. 17, 1960
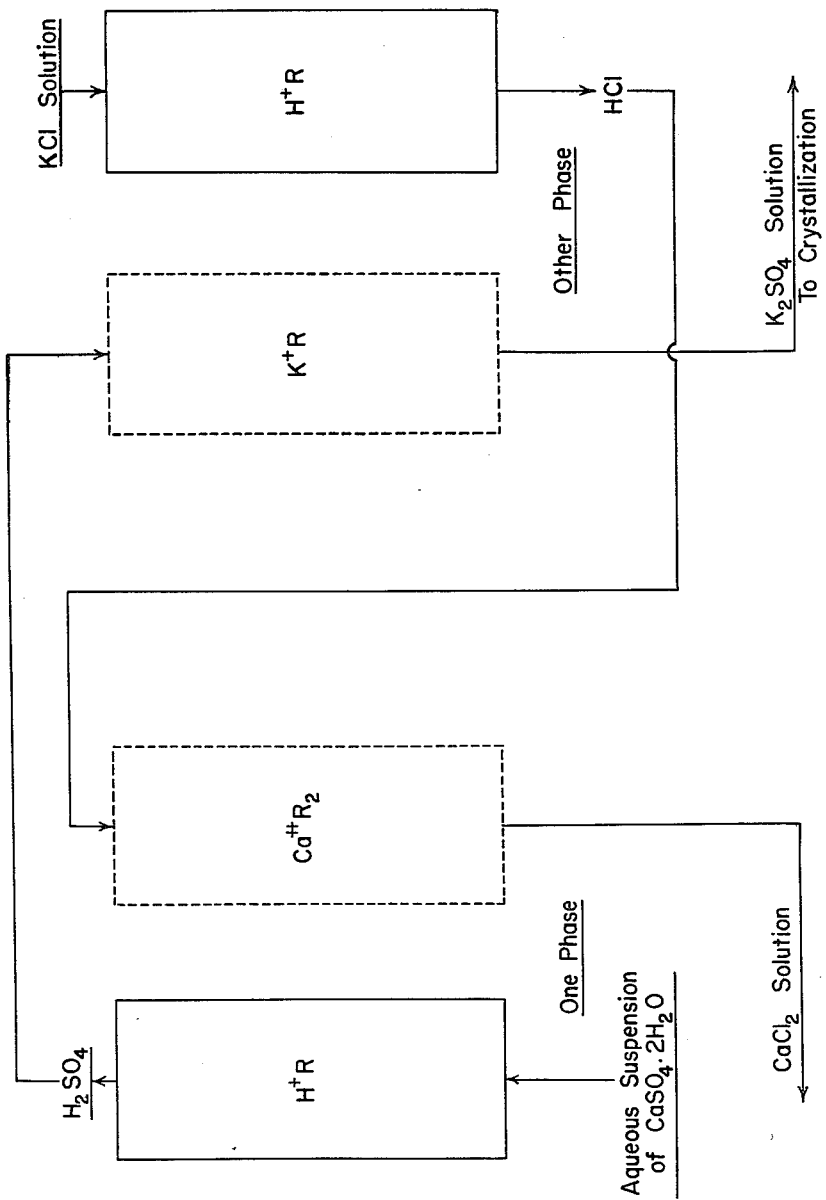
*INVENTOR.*
PABLO HADZERIGA
BY
ATTORNEYS

United States Patent Office 3,096,153
Patented July 2, 1963

3,096,153
ION EXCHANGE PROCESS FOR PRODUCING POTASSIUM SULFATE AND SULFURIC ACID
Pablo Hadzeriga, Salt Lake City, Utah, assignor, by mesne assignments, to Standard Magnesium Corporation, Inc., Tulsa, Okla., a corporation of New York
Filed Oct. 17, 1960, Ser. No. 63,075
5 Claims. (Cl. 23—121)

This invention relates to the manufacture of potassium sulfate and is concerned with utilizing gypsum and potassium chloride as raw materials.

While potassium chloride is a useful potassium salt for various industrial purposes and as a fertilizer, it is considerably less valuable than potassium sulfate. A principal object of this invention is to provide a commercially feasible process for producing potassium sulfate by utilizing potassium chloride as a raw material.

Gypsum is a very common form of calcium sulfate, which occurs naturally in many localities. Another object of this invention is to utilize gypsum as a source of sulfate in a process for producing potassium sulfate from potassium chloride.

In accomplishing these objects, a special ion exchange procedure employing a cation exchange resin is utilized.

As an important feature of the invention, this exchange procedure is carried out on an integrated, cross cycle basis, involving, as one phase, bringing an aqueous suspension of gypsum into contact with a quantity of the exchange resin in its hydrogen form, to remove calcium ions from such suspension and to replace them with hydrogen ions, and as another phase, bringing a solution of potassium chloride into contact with a second quantity of exchange resin in its hydrogen form to remove potassium ions from such solution and replace them with hydrogen ions.

The one phase yields sulfuric acid as the effluent, which is used as the eluant for the second quantity of exchange resin. The other phase yields hydrochloric acid as the effluent, which is used as the eluant for the first quantity of exchange resin.

Elution of the potassium-loaded, second quantity of exchange resin with the sulfuric acid from the one phase yields a solution of potassium sulfate as the eluate. This is advantageously passed to a crystallization stage for formation of a final potassium sulfate product. Elution of the calcium-loaded, first quantity of resin with the hydrochloric acid from the other phase yields a by-product, i.e. calcium chloride solution, as the eluate. Both quantities of the exchange resin are regenerated for re-use in the process by these respective elutions.

Among the unique characteristics of the process is the fact that an elevated temperature is necessary, as a practical matter, to effect an ion exchange between the gypsum and the exchange resin. This contrasts with normal solubility characteristics of gypsum in water, where increase in temperature decreases solubility.

In this connection, the production of sulfuric acid from gypsum by ion exchange represents one of the accomplishments of the present process and is believed to constitute a novel and patentable procedure in its own right apart from other steps of the overall process here disclosed.

Likewise, the production of $K_2SO_4$ from KCl by ion exchange represents an accomplishment of the present invention irrespective of the source of the $H_2SO_4$ eluant.

It might be supposed that the integrated, cross cycle procedure outlined above is unduly cumbersome and that the exchange could be more advantageously made by merely bringing the KCl solution into contact with a cation exchange resin in calcium form ($Ca^{++}R_2$) to load the resin with potassium ions ($K^+R$) and yield $CaCl_2$ as the effluent, and, thereafter, by bringing the gypsum suspension ($CaSO_4 \cdot 2H_2O$) into contact with such potassium-loaded resin to yield $K_2SO_4$ as the effluent and to regenerate the resin for a next cycle of continuous operation, but such procedure has not proven satisfactory in practice because the exchange capacity of the resin under these circumstances drops to an impractically low level and the concentration of the resulting $K_2SO_4$ solution is far too low for any commercial purpose.

A flowsheet indicative of the procedure presently regarded as the best mode of carrying out the invention in practice appears as the single FIGURE of the accompanying drawing.

As indicated by the drawing, the process may advantageously be carried out by flowing the solutions through columns of the exchange resin in accordance with customary practice in the art and utilizing standard equipment, the gypsum suspension being fed upwardly to avoid any danger of plugging. While single columns are shown as a matter of convenience, it should be realized that multiple columns for each phase are contemplated in accordance with generally accepted practice. The dotted line representations of exchange columns indicate the loaded condition of the columns shown by full lines.

While I have chosen to indicate column operation throughout, a resin-in-pulp technique often may be found preferable for the handling of the gypsum suspension.

An aqueous suspension of gypsum ($CaSO_4 \cdot 2H_2O$) is passed upwardly through the exchange column of the one phase of the process in intimate contact with a cationic exchange resin in its hydrogen form ($H^+R$), as indicated, yielding sulfuric acid ($H_2SO_4$) as the effluent. Meanwhile, a potassium chloride solution (KCl) is passed through the exchange column of the other phase of the process in intimate contact with a cationic exchange resin, also in its hydrogen form ($H^+R$), yielding hydrochloric acid (HCl) as the effluent.

Ion exchange between the suspension and the resin in the first phase leaves the resin loaded with calcium ions ($Ca^{++}R_2$), while ion exchange between the solution and the resin in the second phase leaves the resin loaded with potassium ions ($K^+R$).

Elution of the potassium-loaded resin in the second phase (column indicated by dotted lines) with the sulfuric acid effluent from the first phase yields a potassium sulfate solution ($K_2SO_4$) as the eluate. Elution of the calcium-loaded resin in the first phase (column indicated by dotted lines) with the hydrochloric acid effluent from the second phase yields a calcium chloride solution ($CaCl_2$) as the eluate.

Crystallization of the potassium sulfate eluate by any suitable procedure, such as evaporation, yields solid $K_2SO_4$ as a final product. The calcium chloride eluate may be passed to waste or may be regarded as a by-product of the process and utilized as found most suitable in any given instance.

As apparent from the above, the process is carried on in a system utilizing two sets of exchange apparatus, each set being fed by a different influent material and each being eluted by the effluent of the other, the effluent from one representing the desired product. Thus, the system may be appropriately referred to as operating on an integrated, cross-cycle basis.

The one phase of the process whereby an aqueous suspension of gypsum is utilized as the influent is believed to be a new way of processing gypsum for the production of sulfuric acid. The reaction is a follows:

$$2H^+R + CaSO_4 \cdot 2H_2O \rightleftharpoons H_2SO_4 + Ca^{++}R_2 + 2H_2O$$

While an immediate exchange reaction takes place upon contact between the suspension and the resin, the extent of the exchange is so slight at room temperature (20° C.) as to be ineffective from a commercial standpoint. However, I have found that increase in the temperature at which the exchange is carried out is accompanied by sharp increase in the rate at which and the extent to which the exchange takes place. At around 50° C. a reasonably fast exchange takes place with a reasonably good yield, but a temperature of from 60° to 65° C. is preferable for most commercial applications. Generally speaking, the higher the temperature the greater the yield. Thus, I have found that, at 65° C., approximately 55% of the theoretical capacity of the resin is utilized, while, at 80° C., approximately 80% is utilized. At 60° C. and above the conversion from gypsum to sulfuric acid is practically instantaneous.

It is clear from the above that the temperature at which the exchange reaction is carried out in the one phase of the process in any given instance will depend upon economic factors, the cost of increased heating being weighed against the greater returns to be derived.

In the overall process of this invention, it is of course highly advantageous to utilize the HCl effluent from the other or second exchange phase of the process as the regenerating eluant for the calcium-loaded resin of the one or first exchange phase. However, where only such one exchange phase is utilized for the primary purpose of producing sulfuric acid from gypsum, any suitable regenerating eluant may be employed, as, for example, other strong acids such as nitric or phosphoric acid.

The other or second exchange phase of the process utilizing a solution of potassium chloride as the influent raw material can be carried out at any convenient temperature, but the elution stage is preferably hot because of the low solubility of potassium sulfate in water and the desirability of achieving a high concentration thereof in the eluate solution to minimize the quantity of water which must be evaporated in order to obtain the $K_2SO_4$ in crystalline form. Inasmuch as the $H_2SO_4$ effluent from the one exchange phase of the process is already hot, it ideally serves as the eluant for this other phase.

In instances where a plentiful supply of sulfuric acid exists, potassium sulfate can be advantageously produced from potassium chloride by carrying out only this other ion exchange phase of the overall process of the invention. In such instances, the HCl effluent from the primary exchange operation may be regarded as a by-product.

The following tests were carried out in the laboratory utilizing a resin-in-pulp technique for the one phase yielding sulfuric acid:

Test No. 1

1000 g. of wet "Dowex 50W–X8" resin (strongly acid sulfonated styrene-divinylbenzene) in H+ form was used to transform a suspension of 86.1 g. of $CaSO_4 \cdot 2H_2O$ in 400 g. of water to a solution of 80.5 g./liter of $H_2SO_4$ at a temperature of 65° C. in less than 5 minutes contact time. The $H_2SO_4$ solution was passed through a column of the same resin in the K+ form preheated to 65° C. to obtain, after draining the water from the column, a solution containing an average of 130 g. of $K_2SO_4$ per liter (saturated at about 45° C.). This $K_2SO_4$ solution had a pH of 1.5 because of the small amount of $H_2SO_4$ which was not converted, but a good crop of $K_2SO_4$ crystals was obtained by evaporation to dryness. The small amount of $H_2SO_4$ was unnoticeable and did not affect the crystallization.

Test No. 2

A multiple batch operation, involving twelve batches of 200 g. each of "Dowex 50W–X8" resin in its hydrogen form, was carried out in accordance with the one phase of the process. An aqueous suspension of gypsum, similar to that of the foregoing test but prepared from the dilute sulfuric acid solution obtained from the customary resin-washing steps of previous tests, was utilized as the influent. This yielded a steady supply of about 100 g./l. $H_2SO_4$ solution at a working temperature between 70° and 80° C. The recovery of sulfate ion as sulfuric acid was very close to the theoretical and the capacity of the resin was nearly 80% of the theoretical.

The $H_2SO_4$ solution so obtained was utilized as the eluant for a two column exchange operation conforming to the other phase of the process and utilizing the same type of resin in its potassium form preheated to 70° C. A solution of $K_2SO_4$ containing approximately 130 g./l. was obtained.

As can be seen from the test examples given above, the gypsum suspension is actually a slurry thick enough to give a satisfactory concentration of $H_2SO_4$ in the effluent.

Whereas there are here illustrated and described certain preferred procedures which I presently regard as the best mode of carrying out my invention, it should be understood that various changes may be made without departing from the inventive concepts particularly pointed out and distinctly claimed herebelow.

I claim:

1. An ion exchange process for producing potassium sulfate from calcium sulfate and potassium chloride as raw materials, comprising bringing an aqueous suspension of calcium sulfate and a cation exchange material in hydrogen form into intimate contact at a temperature of at least about 50° C. to effect ion exchange therebetween, yielding sulfuric acid; bringing a solution of potassium chloride and a cation exchange material in hydrogen form into intimate contact to effect ion exchange therebetween, yielding hydrochloric acid; and eluting the last-mentioned exchange material with the sulfuric acid to regenerate said material and yield a solution of potassium sulfate.

2. The process of claim 1, including the additional step of eluting the first-mentioned exchange material with the hydrochloric acid to regenerate said material and yield a solution of calcium chloride.

3. An ion exchange process for producing sulfuric acid from calcium sulfate, comprising bringing an aqueous suspension of calcium sulfate into intimate contact with a cation exchange material in hydrogen form at a temperature of at least about 50° C. to effect ion exchange therebetween, yielding sulfuric acid.

4. The process of claim 3, wherein the loaded exchange material is regenerated with hydrochloric acid, yielding calcium chloride solution.

5. The process of claim 1, including the additional step of crystallizing potassium sulfate as a commercial product from the solution of potassium sulfate.

References Cited in the file of this patent

UNITED STATES PATENTS

| | | |
|---|---|---|
| 2,334,904 | Cheetham | Nov. 23, 1943 |
| 2,413,784 | Rawlings et al. | Jan. 7, 1947 |
| 2,748,057 | Goren | May 29, 1956 |
| 2,751,280 | Hasselder | June 19, 1956 |

FOREIGN PATENTS

| | | |
|---|---|---|
| 547,019 | Great Britain | Aug. 10, 1942 |
| 630,979 | Great Britain | Oct. 25, 1949 |